US012710028B2

(12) United States Patent
March Nomen

(10) Patent No.: US 12,710,028 B2
(45) Date of Patent: Aug. 18, 2026

(54) WIND TURBINE BLADE

(71) Applicant: Siemens Gamesa Renewable Energy Innovation & Technology, S.L., Sarriguren (ES)

(72) Inventor: Victor March Nomen, Sant Cugat del Valles (ES)

(73) Assignee: Siemens Gamesa Renewable Energy Innovation & Technology, S.L., Sarriguren (ES)

( * ) Notice: Subject to any disclaimer, the term of this patent is extended or adjusted under 35 U.S.C. 154(b) by 0 days.

(21) Appl. No.: 19/129,133

(22) PCT Filed: Nov. 10, 2023

(86) PCT No.: PCT/EP2023/081488

§ 371 (c)(1),
(2) Date: May 12, 2025

(87) PCT Pub. No.: WO2024/104919

PCT Pub. Date: May 23, 2024

(65) Prior Publication Data

US 2026/0185505 A1 Jul. 2, 2026

(30) Foreign Application Priority Data

Nov. 14, 2022 (EP) .................................... 22383093

(51) Int. Cl.
*F03D 80/30* (2016.01)
*H02G 13/00* (2006.01)

(52) U.S. Cl.
CPC ........... *F03D 80/301* (2023.08); *H02G 13/40* (2013.01)

(58) Field of Classification Search
CPC . F03D 80/30; F03D 80/301; F05B 2270/1077
See application file for complete search history.

(56) References Cited

U.S. PATENT DOCUMENTS

| | | | | |
|---|---|---|---|---|
| 8,096,765 B2 * | 1/2012 | Fritz | ..................... | F03D 1/0675 416/62 |
| 8,517,681 B2 * | 8/2013 | Naka | ....................... | F03D 80/30 416/1 |

(Continued)

FOREIGN PATENT DOCUMENTS

| | | |
|---|---|---|
| EP | 4019772 A1 | 6/2022 |
| EP | 4112921 A1 | 1/2023 |
| GB | 2519333 A | 4/2015 |

OTHER PUBLICATIONS

PCT International Search Report and Written Opinion of International Searching Authority mailed Jan. 22, 2024) corresponding to PCT International Application No. PCT/EP2023/081488 filed Nov. 10, 2023.

*Primary Examiner* — Courtney D Heinle
*Assistant Examiner* — Danielle M. Christensen
(74) *Attorney, Agent, or Firm* — Schmeiser Olsen PLLC

(57) ABSTRACT

A blade for a wind turbine including a lightning protection system and a non-conductive exterior surface. The lightning protection system includes an internal down conductor for conducting lightning current towards a base portion of the blade, and one or more exposed lightning receptors. For the lightning receptors, for one or more points on the other of the suction side or pressure side of the blade at the spanwise position corresponding to the lightning receptor, the total breakdown voltage along any path of lightning from any of the one or more points to the lightning receptor via the interior of the blade is greater than the total breakdown voltage along an indirect path from the point to the lightning receptor around the exterior surface of the blade.

15 Claims, 6 Drawing Sheets

(56) References Cited

U.S. PATENT DOCUMENTS

| | | | | |
|---|---|---|---|---|
| 10,883,479 | B2 | 1/2021 | Whitehouse et al. | |
| 11,015,582 | B2 * | 5/2021 | Barton | F03D 1/0675 |
| 11,346,328 | B2 * | 5/2022 | Brilliant | F03D 80/30 |

* cited by examiner 221
300
22
2
1
3

200
400
3B
3E
26
400
3B
25
27
400
23
31
24
3E
21

26
201
200
406
27
202
24
23
404
402
400
25

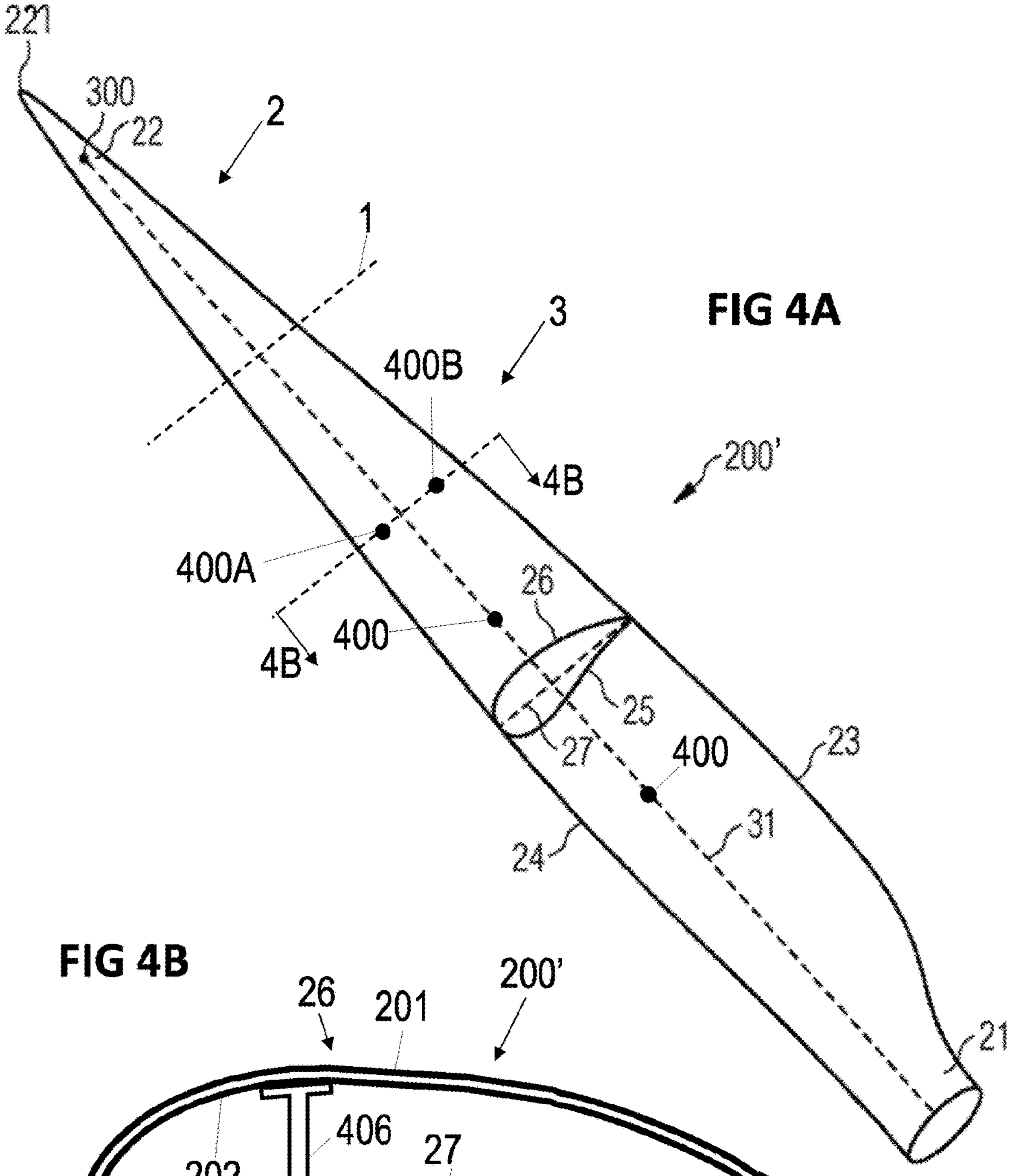
FIG 4A
FIG 4B
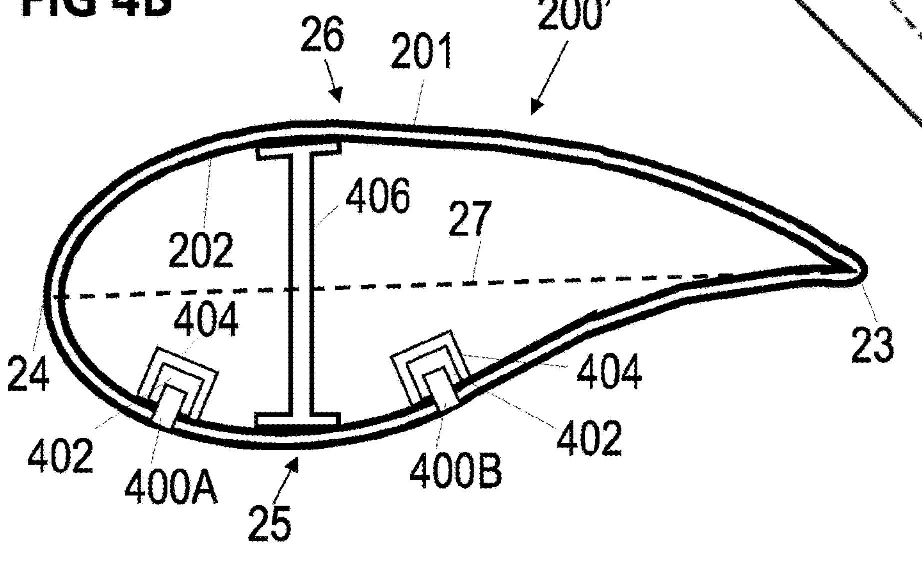
221
300
22
2
1
3
400B
4B
200'
400A
26
400
4B
25
27
400
23
31
24
21
26
201
200'
406
27
202
404
24
23
404
402
402
400A
400B
25

WIND TURBINE BLADE

CROSS-REFERENCE TO RELATED APPLICATIONS

This application is a national stage of PCT Application No. PCT/EP2023/081488, having a filing date of Nov. 10, 2023, which claims priority to EP Application Serial No. 22383093.6, having a filing date of Nov. 14, 2022, the entire contents both of which are hereby incorporated by reference.

FIELD OF TECHNOLOGY

The following relates to a wind turbine blade, and more particularly to a wind turbine blade comprising a lightning protection system. The following also relates to a wind turbine comprising one or more of the wind turbine blades, and to a method of manufacturing the wind turbine blades.

BACKGROUND

Wind turbines are highly susceptible to lightning strikes, and in particular wind turbine blades, which extend to the highest point of the turbine as during rotation of the turbine. If the electrical current of a lightning strike is not safely directed through the wind turbine and to ground, the electrical current may cause severe damage to components of the wind turbine and cause failure of the turbine. For example, if the lightning current penetrates directly through the surface of a turbine blade, which is typically made from composite non-conductive material unable to easily transfer electrical energy, the current may cause critical damage to the surface, causing catastrophic failure to the blade and requiring repair works. Further, wind turbine blades are typically hollow in order to reduce the weight of the blade. Should lightning arcs occur in the hollow interior of such a blade, this can cause damage to the interior structural supports and generate trapped gases in the interior, likely leading to failure of the blade. Repair works for wind turbines are costly, especially if the turbine is located in difficult to access areas such as offshore.

Typical lightning protection systems comprise a plurality of conductive lightning receptors located along the length of the blade. The lightning receptors are electrically connected to a down conductor which safely directs the lightning current towards the base of the blade and to ground, thereby mitigating the risk of electrical current passing through another component and causing damage to the wind turbine. In such lightning systems, the lightning receptors are placed along the length of the blade on both the pressure side and suction side of the blade, which allows lightning to be safely directed to the down conductor regardless of whether the lightning strikes the blade on the pressure side or the suction side of the blade. Typically, the lightning receptors are connected to a conducting block extending between the pressure and suction side of the blade, which is in turn electrically connected to the down conductor.

In the regions of the blade further from the tip of the blade, the distance between the pressure side and suction side of the blade increases, meaning that the lightning receptors and conducting block must be longer in order to extend across the suction and pressure sides of the blade. This increases both the cost and complexity of manufacture of the turbine blade. The documents US 2016/258 423 A1, EP 4 019 772 A1, EP4 112 921 A1 and GB 2 519 333 A disclose different blades with lightning protection systems.

There is therefore a need for a wind turbine blade having a lightning transmission system which provides the same level of protection from lightning strikes whilst having a reduced cost and complexity of manufacture.

SUMMARY

An aspect relates to a blade for a wind turbine, a wind turbine and a method.

According to a first aspect of embodiments of the invention there is provided a blade for a wind turbine comprising a lightning protection system and a non-conductive exterior surface, the lightning protection system comprising: an internal down conductor for conducting lightning current towards a base portion of the blade; one or more exposed lightning receptors, the one or more lightning receptors located on a suction side or a pressure side of the blade at a spanwise position of the blade, the one or more lightning receptors extending through the exterior surface of the blade and electrically connected to the internal down conductor; wherein for one or more of the lightning receptors: for one or more points on the other of the suction side or pressure side of the blade at the spanwise position corresponding to the lightning receptor, the total breakdown voltage along any path of lightning from any of the one or more points to the lightning receptor via the interior of the blade is greater than the total breakdown voltage along an indirect path from the point to the lightning receptor around the exterior surface of the blade.

According to a further aspect of embodiments of the invention there is provided a wind turbine comprising one or more blades according to the first aspect.

According to a further aspect of embodiments of the invention there is provided a method of manufacturing a blade for a wind turbine, in embodiments, the method comprising: providing a blade having a non-conductive exterior surface; providing a down conductor for conducting lightning current towards a base portion of the blade and locating the down conductor in an interior of the blade; providing one or more lightning receptors and for each lightning receptor: extending the lightning receptor through the exterior surface of a suction side or a pressure side of the blade at a spanwise position of the blade and exposing the lightning receptor externally to the blade; and electrically connecting the lightning receptor to the internal down conductor; wherein for one or more of the lightning receptors: for one or more points on the other of the suction side or pressure side of the blade at the spanwise position corresponding to the lightning receptor, the breakdown voltage for a path of lightning from any of the one or more points to the lightning receptor through the interior of the blade is greater than the breakdown voltage for an indirect path from the point to the lightning receptor around the exterior surface of the blade.

BRIEF DESCRIPTION

Some of the embodiments will be described in detail, with reference to the following figures, wherein like designations denote like members, wherein:

FIG. 4A shows a schematic view of a wind turbine blade according to embodiments;

FIG. 4B shows a cross-sectional view of the wind turbine blade of FIG. 4A taken along line 4B-4B.

DETAILED DESCRIPTION

As used herein, the term "lightning receptor" may be understood to mean any electrically conductive element configured to be exposed to the outside environment of a wind turbine blade to receive lightning current, and further configured to electrically connect to a down conductor of the wind turbine blade. The lightning receptors as disclosed herein may have an external surface which is flush with the exterior surface of the blade or may protrude from the exterior surface.

As used herein, the term "down conductor" may be understood to mean any electrically conductive cable which is configured to extend from a base portion of a wind turbine blade to a tip portion of the wind turbine blade, and to conduct lightning current from the tip portion to the base portion. The down conductor may be an electrically insulated metallic (e.g., copper) cable of a thickness which is sufficient to withstand the high level of lightning current without damaging the cable, for example through resistive heating. The down conductor may be electrically insulated with a polymer such as polyurethane.

As used herein, the term "spanwise position" may be understood to mean a position of the blade along the longitudinal axis of a wind turbine blade, defined by the line extending between the (centre of) the base of the blade and the tip of the blade.

As used herein, the term "airfoil" may be understood to mean the cross-sectional shape of a wind turbine blade at a given spanwise position of the blade. The airfoil is divided into a pressure side and a suction side.

As used herein, the term "pressure side" may be understood to mean the side of an airfoil which aerodynamically experiences a relatively higher pressure than an opposite side of the airfoil.

As used here, the term "suction side" may be understood to mean the side of an airfoil which aerodynamically experiences a relatively lower pressure than an opposite side of the airfoil.

Figure 1:
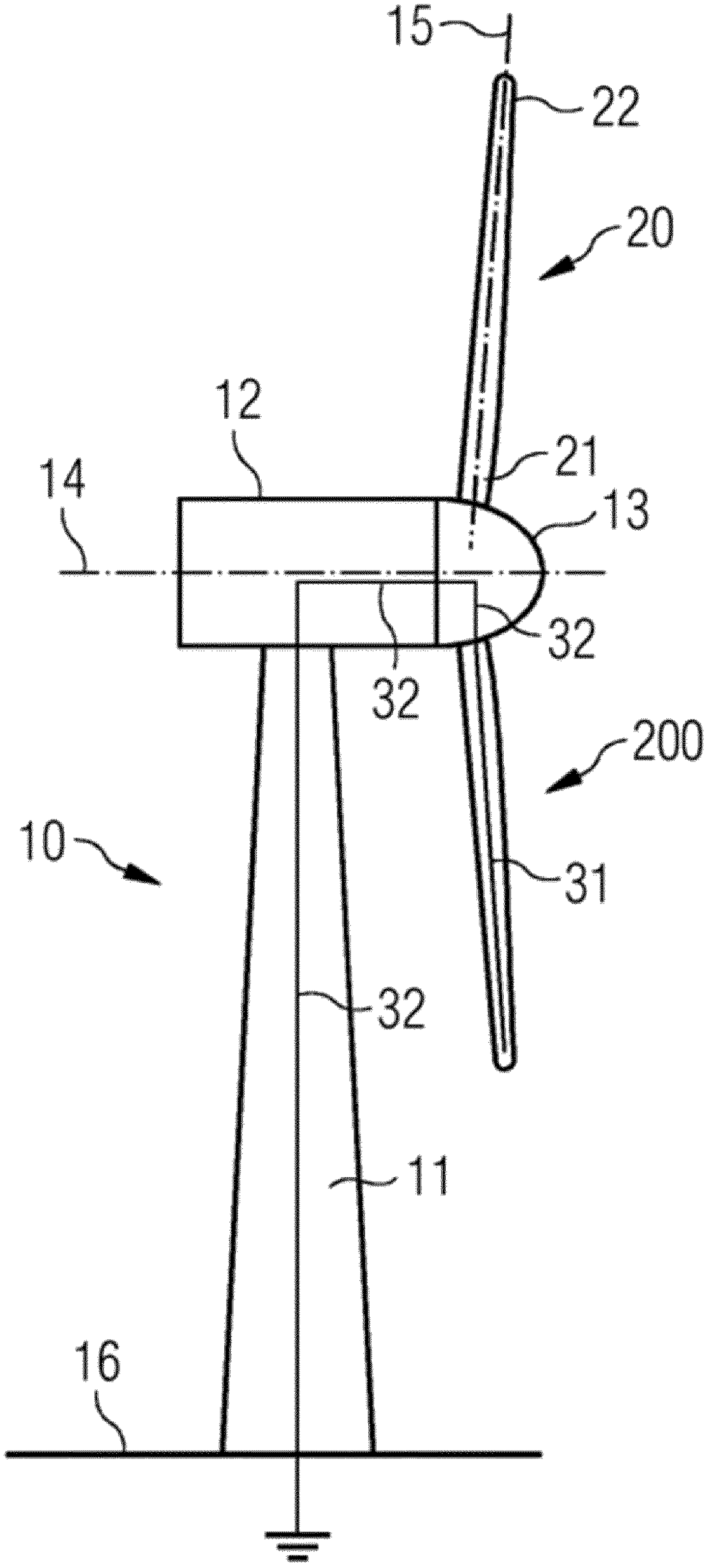
FIG. 1 shows a schematic view of a wind turbine for generating electricity according to embodiments.

FIG. 1 shows a schematic view of a wind turbine 10 for generating electricity according to embodiments. The wind turbine 10 comprises a tower 11. The tower 11 comprises one end by which the tower 11 is connected to the ground 16 and another, opposite end, by which the tower 11 is connected to a nacelle 12 of the wind turbine 10. The nacelle 12 is rotatably mounted relative to the tower 11. This enables a yaw movement of the nacelle 12 with respect to the tower 11. The nacelle 12 accommodates the generator of the wind turbine and further components of the wind turbine 10. If the wind turbine is a geared wind turbine, the nacelle 12 also may comprise a gear box. The wind turbine 10 furthermore comprises a rotor which is rotatably arranged with respect to the nacelle 12. The rotor can thus be rotated about a rotor axis 14 which is located substantially horizontal with regards to the ground 16. The rotor of the wind turbine 10 is configured to capture the energy of the wind by the aerodynamics of one or more blades 20, 200, and transform this energy into a rotational movement and transmit the rotational movement to the generator of the wind turbine 10. The rotor of the wind turbine comprises a hub 13 and at least one, typically two or three, rotor blades 20, 200. The wind turbine 10 comprises at least one blade 200 according to embodiments of the invention but may additionally comprise one or more blades not according to embodiments of the invention. The rotor blades 20, 200 are mounted to the hub 13. Each rotor blade 20, 200 comprises a tip section 22 and a base portion 21. Each rotor blade 20, 200 is mounted at its base portion 21 to the hub 13. One or more of the rotor blades 20, 200 may be rotatably mounted rotatable to the hub 13. This means that the rotor blade can be pitched about a so-called pitch axis 15, which may be considered the longitudinal axis of the blade 20, 200, in order to optimize energy capture and loads acting on the rotor blade 20, 200 of the wind turbine 10.

One or more blades 20, 200 of the wind turbine 10 also comprise a lightning protection system. The lightning protection system comprises an internal down conductor 31, extending from the base portion 21 of a given rotor blade 20, 200 to the tip section 22 of the given rotor blade 20, 200. The internal down conductor 31 is connected at the base portion 21 of the rotor blade 20, 200 to a grounding system 32 of the remainder of the wind turbine 10. The grounding system 32 transmits or conducts the electrical current from the internal down conductor 32 to the ground 16.

Figure 2A:
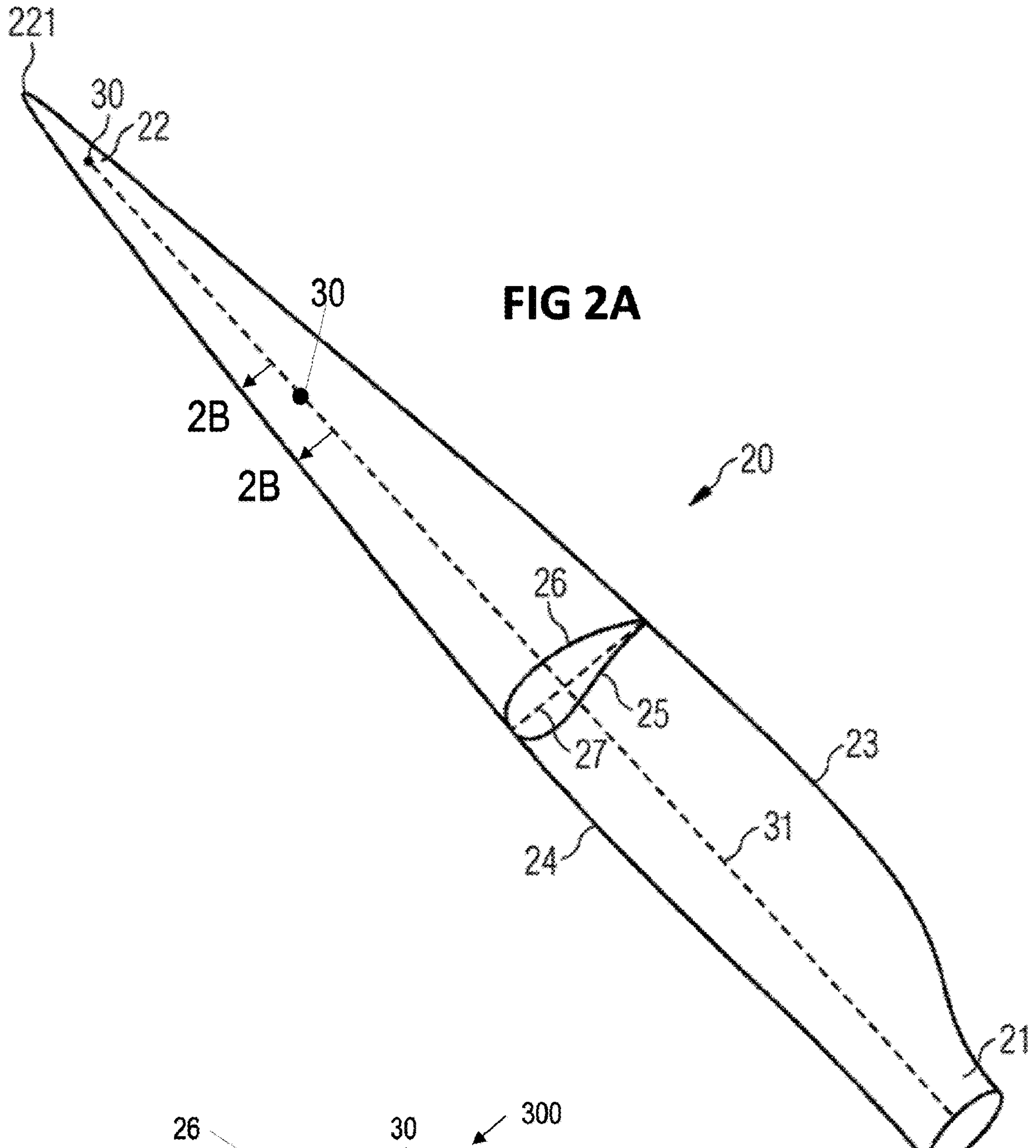
FIG. 2A shows a schematic view of a wind turbine blade known in the prior art.

FIG. 2A shows a schematic view of a wind turbine blade 20 known in the prior art. The blade 20 comprises a base portion 21 and a tip section 22. The radially outmost point of the rotor blade 20 is the so-called tip 221 of the rotor blade 20. The rotor blade 20 furthermore comprises a trailing edge 23 and a leading edge 24. The leading edge 24 typically has a curved and round shape, while the trailing edge 23 may have a sharp or blunt edge. The straight line between the trailing edge 23 and the leading edge 24 defines a chord 27. The chord 27 divides the airfoil at a given spanwise position into a pressure side 25 and the suction side 26. One of the airfoils is exemplarily shown in FIG. 2A. It is to be understood that the rotor blade 20 comprises a plurality of airfoils—one next to the other—from the base portion 21 to the tip section 22. These gradually changing airfoils cause the gradual change of the shape of the rotor blade. The airfoil has a lift generating shape in most of the sections of the rotor blade.

The rotor blade 20 comprises a lightning protection system with one or more lightning receptors 30 and a down conductor 31 which may be also called a lightning conductor cable. When the blade 20 is mounted to the turbine 10 shown in FIG. 1, the down conductor 31 connects the lightning receptor(s) 30 with the ground 16 via the hub 13, the nacelle 12 and the tower 11. The rotor blade 20 usually comprises several lightning receptors 30 at different spanwise positions all electrically connected to the down conductor 31.

Figure 2B:
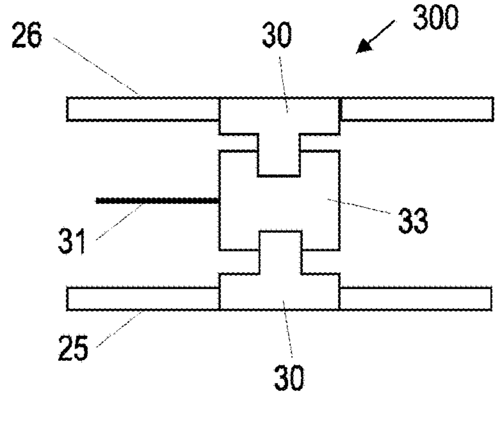
FIG. 2B shows a cross-sectional view of the wind turbine blade of FIG. 2A taken along line 2B-2B.

FIG. 2B shows a cross-sectional side view of the blade 20 according to the prior art taken along the line 2B-2B shown in FIG. 2A. At each spanwise position, a pair 300 of lightning receptors 30 are provided, a first lightning receptor 30 exposed on the pressure side 25 and a second lightning receptor 30 exposed on the suction side 26, so that lightning may be safely conducted to the down conductor 31 without passing through the non-conductive blade surface, regardless of whether lightning strikes the pressure side 25 or the suction side 26 of the blade at or near the spanwise position. Both lightning receptors 30 of each lightning receptor pair 300 are electrically connected to the down conductor, any may be connected via a conductive block 33 to which the lightning receptors are mounted. Especially at spanwise positions farther from the tip 221, in which the distance between the pressure side 25 and the suction side 26 is greater, this increases the complexity of manufacture, requires more materials, and also increases the weight of the blade as the metallic components of the lightning protection system must extend across the wider distance between the sides of the blade, which is undesirable as lighter blades are typically desired for their aerodynamic qualities.

Figure 3A:
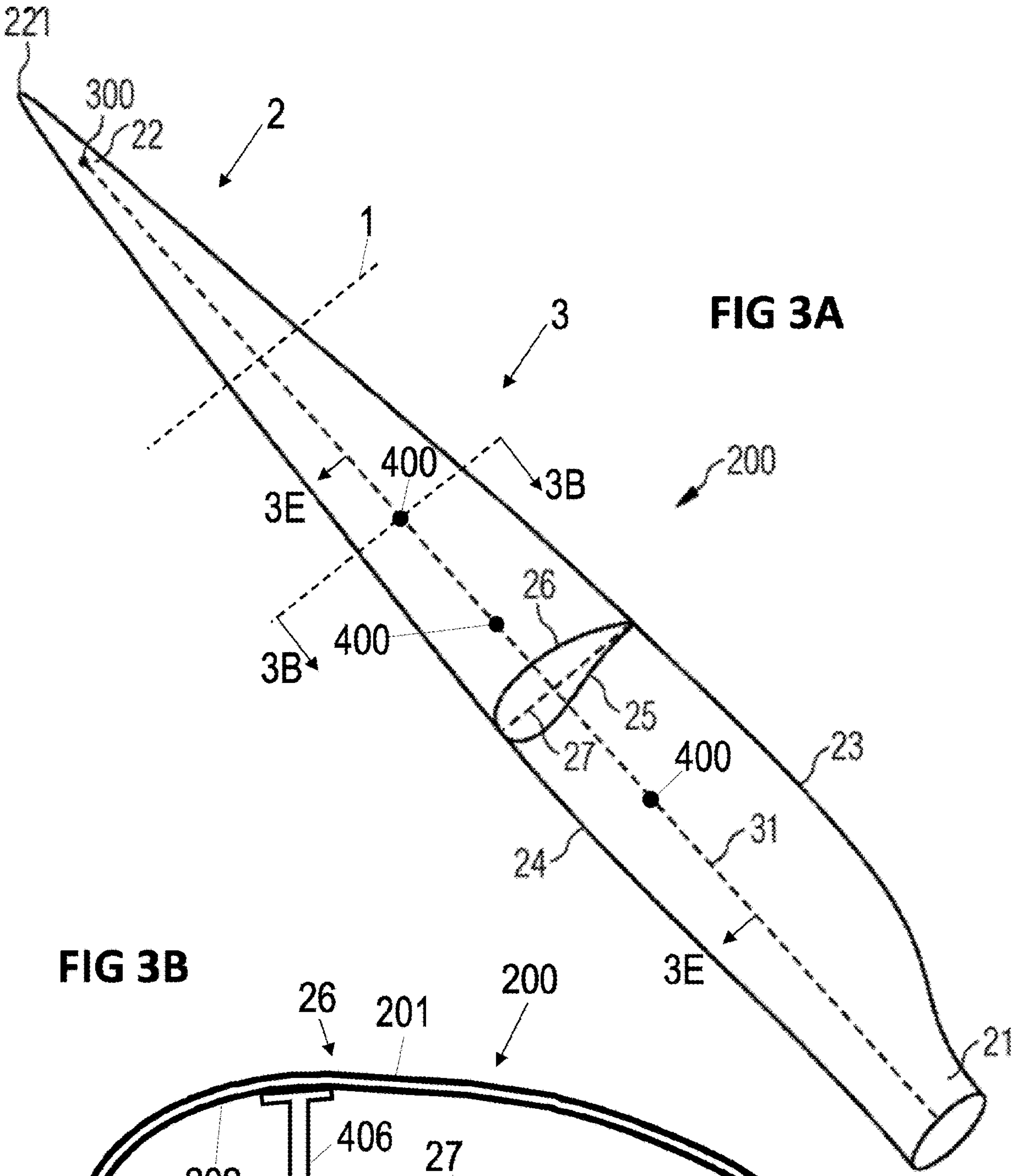
FIG. 3A shows a schematic view of a wind turbine blade according to embodiments.

FIG. 3A shows a wind turbine blade 200 according to embodiments. Like the blade 20 described with reference to FIGS. 2A and 2B, the blade 200 comprises a base portion 21 and a tip section 22 and a tip 221 being the radially outmost point of the rotor blade 20. The rotor blade 20 furthermore comprises a trailing edge 23 and a leading edge 24. The leading edge 24 typically has a curved and round shape, while the trailing edge 23 may have a sharp or blunt edge. The straight line between the trailing edge 23 and the leading edge 24 defines a chord 27. The chord 27 divides the airfoil at a given spanwise position into a pressure side 25 and the suction side 26. One of the airfoils is exemplarily shown in FIG. 3A. It is to be understood that the rotor blade 20 comprises a plurality of airfoils—one next to the other—from the base portion 21 to the tip section 22. These gradually changing airfoils cause the gradual change of the shape of the rotor blade. The airfoil has a lift generating shape in most of the sections of the rotor blade. The blade 200 may comprise a shell having an exterior surface 201 (see FIG. 4B) and an interior surface 202 defining an interior cavity of the blade 200. The shell may be made of any suitable material, for example fibreglass, fibreglass-reinforced polyester or epoxy, carbon fibre, aramid or wood fibre, or laminates or composites thereof.

Also, as for blade 20 previously described, the rotor blade 200 comprises a lightning protection system with one or more exposed lightning receptors 400 and a down conductor 31 which may be also called a lightning conductor cable. When the blade 200 is mounted to the turbine 10 shown in FIG. 1, the down conductor 31 connects the lightning receptor(s) 400 with the ground 16 via the hub 13, the nacelle 12 and the tower 11. The rotor blade 200 may comprise several lightning receptors 400 at different spanwise positions all electrically connected to the down conductor 31. The rotor blade may optionally also comprise one or more lightning receptor pairs 300.

The blade 200 may comprise a tip region 2 extending from the distal tip 221 of the blade 200 to an intermediate spanwise position 1, and a proximal region 3 extending from the base 21 of the blade 200 to the intermediate spanwise position 1.

For one or more of the exposed lightning receptors 400, the lightning receptor 400 is located on one of the suction side 26 and pressure side 25 of the blade 200. At the spanwise position of the lightning receptor 400, the other side of the suction side 26 and the pressure side 25 may be free from lightning receptors. That is, at one or more spanwise positions of the blade 200 where a lightning receptor 400 is located, the other side may not comprise a lightning receptor 400, (although in some embodiments the other side may comprise lightning receptors 400 at other spanwise positions).

The one or more lightning receptors 400 may all be provided in the proximal region 3 of the blade 200. A plurality of the lightning receptors 400 may be provided in the proximal region 3 at different spanwise positions. When a plurality of lighting receptors 400 are provided at different spanwise positions.

In addition to the one or more lightning receptors 400, there may additionally be provided one or more exposed lightning receptor pairs 300. Each of the one or more receptor pairs 300 may be placed at a spanwise position in the tip region 2 and may be placed at different spanwise positions. Each of the one or more lightning receptor pairs 300 may comprise a first lightning receptor 30 located on the suction side 26 of the blade 200 and a second lightning receptor 30 located on the pressure side 25 of the blade 200, the first and second lightning receptors 30 extending through the exterior surface 201 of the blade and electrically connected to the internal down conductor 31, such as that configuration illustrated in FIG. 2B. As illustrated in FIG. 2B, one or both of the lightning receptors 30 may be electrically connected to an electrically conductive block 33 mounted to an interior surface of the blade 200 at the spanwise position of the lightning receptors 30, wherein the electrically conductive block 33 is electrically connected to the down conductor 31. In some embodiments, an electrical insulator covers one or both of the lightning receptors 30 in the interior of the blade 200 such that any path of lightning through the interior of the blade passes through the electrical insulator. The insulator may be any suitable material such as a resin or polymer and may be precasted or cured.

Figure 3B:
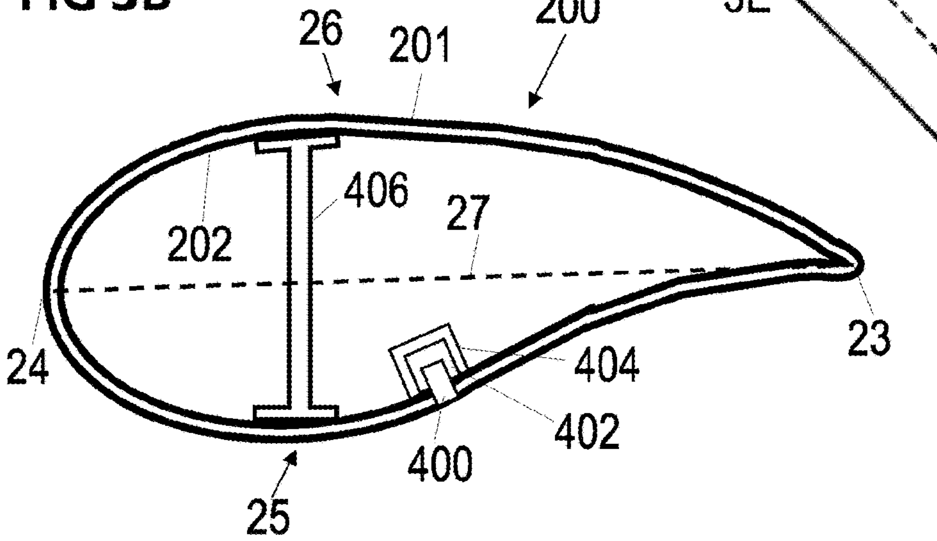
FIG. 3B shows a cross-sectional view of the wind turbine blade of FIG. 3A taken along line 3B-3B.

FIG. 3B shows a cross-sectional view of the blade 200 shown in FIG. 3A taken along line 3B-3B. The blade 200 comprises a non-conductive exterior surface 201. The blade 200 may also comprise an interior surface 202 defining a hollow interior space of the blade 200. The lightning receptor 400 extends through the exterior surface 201 of the blade 200 and is electrically connected to the internal down conductor 31. In some embodiments, and as illustrated in FIG. 3B, the lightning receptor 400 is electrically connected (for example mounted) to an electrically conductive block 402 mounted to the interior surface 202 at the spanwise position of the lightning receptor 400, and the electrically conductive block 402 is in turn electrically connected to the down conductor 31. In embodiments, the lightning receptor 400 may be directly mounted and electrically connected to the down conductor 31, for example by welding or similar. In some embodiments, an electrical insulator 404 may cover the lightning receptor 400 and or the electrically conductive block 402 in the interior of the blade such that any path of lightning through the interior of the blade passes through the electrical insulator 404. The provision of such an insulator 404 increases the breakdown voltage of any lightning path which passes through the interior of the blade 200. The blade 200 may also comprise one or more structural supports 406 extending between the pressure side 25 and suction side 26, such as a web, at one or more spanwise positions of the blade 200, to provide structural support to the blade 200. The insulator 404 may be made of any electrically insulating material such as an insulating resin, polymer, or concrete. The insulator 404 may be precasted or cured. The structural supports 406 may be made of any suitable material providing the required structural strength to the blade.

It is noted that the insulator 404 should completely cover the electrical connections in order to prevent the existence of an air gap which would allow the electrical current to bypass the insulator 404 and pass directly to the lightning receptor 400 or conductive block 402.

Figure 3C:
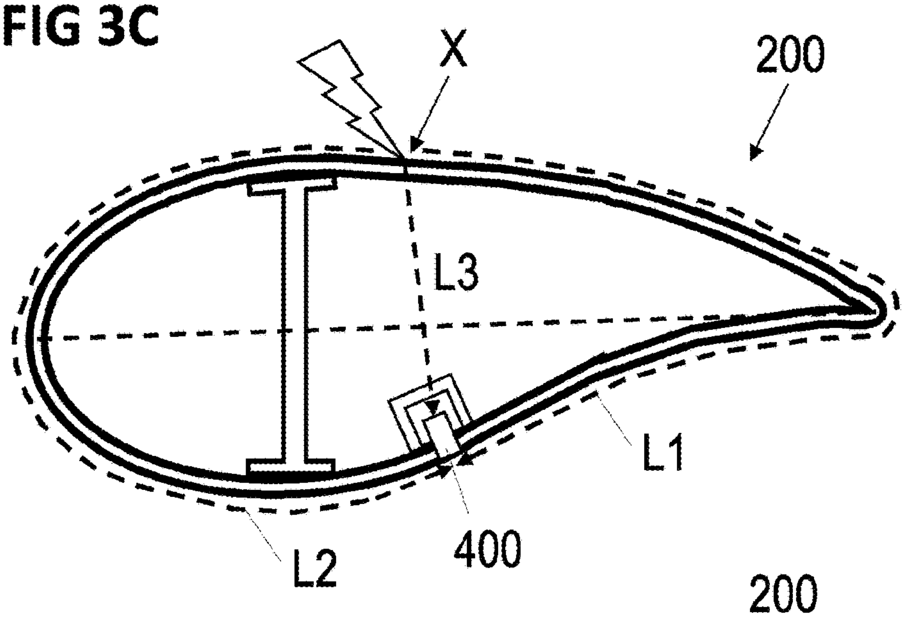
FIG. 3C shows possible paths of lightning current for the wind turbine shown in FIG. 3B.

FIG. 3C shows possible lightning paths for the blade 200 shown in FIG. 3B. In FIG. 3C, a lightning bolt strikes the blade at a location X opposite the lightning receptor 400. The path of the lightning current from point X towards ground depends on the formation of ionized paths or leaders which propagate between the lightning receptor 400 and point X. FIG. 3C shows possible lightning paths L1, L2 and L3 which the lightning current may take. Which path the lightning takes depends on the level of electrical insulation along each path (i.e., the inception voltage for a leader along each path). The lightning will take the path with the lowest level of electrical insulation. Accordingly, if the insulation level for path L3 is higher than the insulation level for at least one of path L1 or L2, then the lightning current will have a strong preference to travel to the lightning receptor 400 indirectly around the exterior of the blade 200 without passing through the surface of the blade 200 or the interior of the blade 200. In such circumstances, the lightning receptor 400 provides protection from lightning strikes on both sides of the blade, even though at the spanwise position a lightning receptor is provided on only one of the pressure side 25 and the suction side 26.

For a given path, the total insulation level can be calculated by summing the inception voltages for an ionized leader along each path. For example, for paths L1 and L2, which begin with the external part of the lightning receptor 400 in contact with the exterior surface 201, the inception voltage is relatively low at about 10 kV/mm (due to the three different permittivities of the receptor material, the exterior surface material, and the air). Once incepted, the leader propagates along the surface and requires about 0.5 kV/mm to propagate along the surface. The total required voltage can therefore be readily calculated. Path L3 passes through the insulator 404, the air internal to the blade and the shell material having the exterior surface 201 and the interior surface 202. The inception voltage from the conductive block 402 would typically be about 30 kV/mm, with about 2 to 5 kV/mm required for the air gap through the interior of the blade 200, and finally a further voltage to cross the shell of the blade proximal to point X. In addition to the path L3, the insulation level for a path along the interior surface 202 may also be calculated to determine if there is any path internal to the blade 200 having a lower insulation level than path L1 or L2. As path L3 is the most direct path through the air gap interior to the blade 200, if the insulation level for the path L3 is higher than either path L1 or L2, it follows that the insulation level along any other path through the air gap interior to the blade is also higher than either path L1 or L2.

It is also noted that for a given blade design including blade shape, dimensions and materials include the dielectric properties of the materials, the propagation of leaders can be simulated using simulators known in the art to determine whether the insulation level for all paths through the blade is higher than an indirect path along the exterior of the blade. The paths of lightning for a given design could also be measured empirically as known in the art.

It is noted that in the tip region 2, the distance between the suction side and the pressure side of the blade may be too narrow for the insulation level of path L3 to be greater than one of paths L1 and L2. Accordingly, for some blade designs in the tip region 2 there are provided receptor pairs having a lightning receptor 30 on either side of the blade 200, so that the blade 200 is protected from lightning on both sides of the blade 200 in the tip region 2.

Figure 3D:
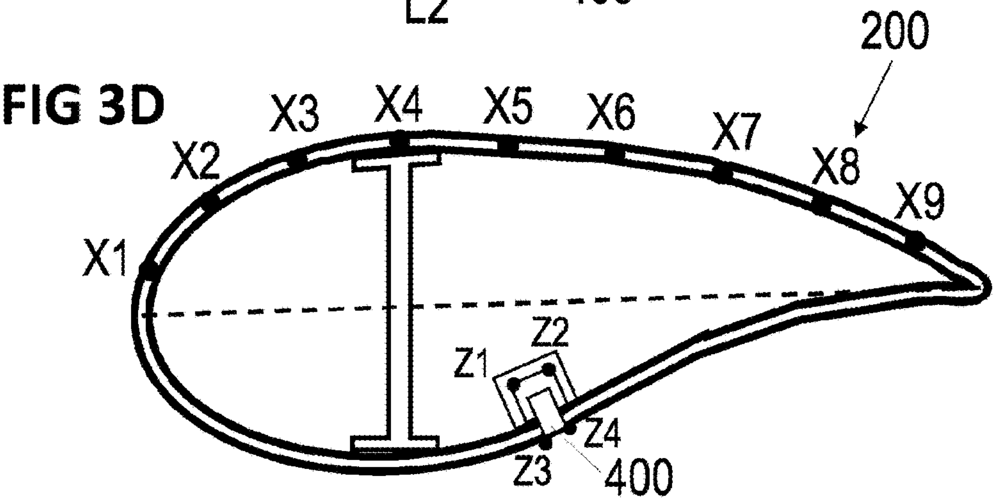
FIG. 3D shows possible start and end points X, Y for leader paths.

In some embodiments and as illustrated in FIG. 3D, for all points on the other side of the blade 200 to the lightning receptor 400, such as points X1 to X9, there exists a path (such as L1 and L2) around the exterior of the blade 200 to the lightning receptor 400 having a lower insulation level than that of any path through the interior blade such as L3. In such embodiments, the lightning receptor 400 is configured to receive substantially all lightning strikes which strike the blade 200 at or near the spanwise position, regardless of whether the lightning strikes on the suction side 26 or pressure side 25 and therefore negates the need for a lightning receptor pair as in the prior art. It is noted that the internal paths such as L3 may be calculated for each extreme point Z1, Z2 on the internal side of the conducting block 402, if a higher accuracy is desired. Similarly, the extreme points Z3, Z4 may be used for the end points of the external paths.

Figure 3E:
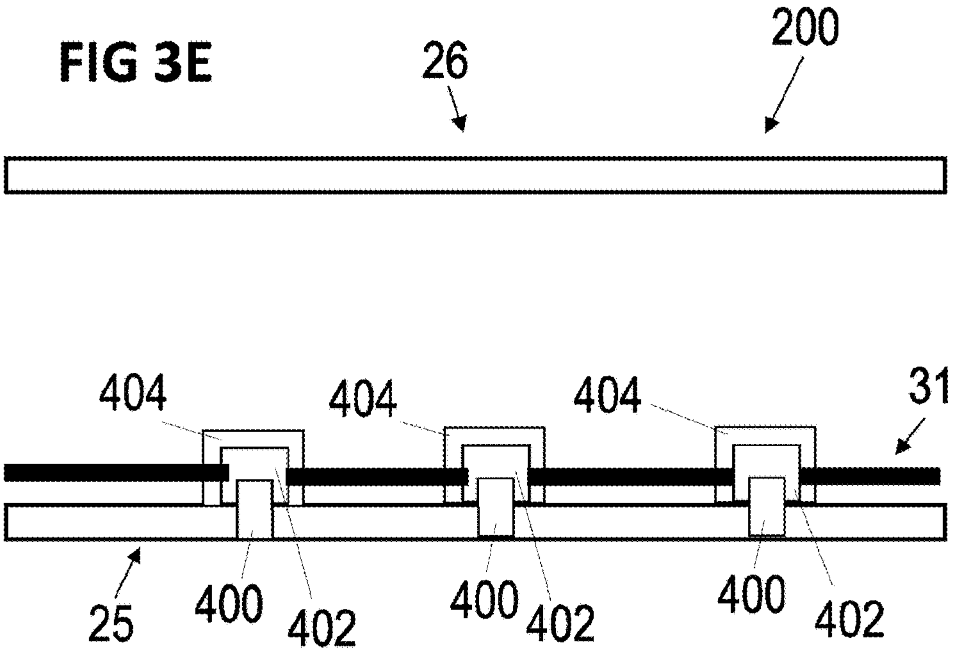
FIG. 3E shows a cross-sectional view of the wind turbine blade of FIG. 3A taken along line 3E-3E.

FIG. 3E shows a cross-sectional view of the wind turbine blade 200 of FIG. 3A taken along line 3E-3E. As illustrated, the lightning receptors 400 may all be provided on the same side, namely all on the pressure side 25. In embodiments, the lightning receptors 400 may all be provided on the suction side 26. Providing the lightning receptors 400 on a single side of the blade 200 simplifies the manufacturing process of the blade 200. In such embodiments, the down conductor 31 may extend along the blade 200 proximal to the side of the blade having the receptors 400 along its entire length, also simplifying manufacture of the blade 200.

Therefore, according to embodiments of the invention, there is provided a blade 200 for a wind turbine comprising a lightning protection system and a non-conductive exterior surface 201, the lightning protection system comprising an internal down conductor 31 for conducting lightning current towards a base portion 21 of the blade 200. The blade 200 also comprises one or more exposed lightning receptors 400 which are located on a suction side 26 or a pressure side 25 of the blade 200 at a spanwise position of the blade 200, the one or more lightning receptors 400 extending through the exterior surface 201 of the blade 200 and electrically connected to the internal down conductor 31. For one or more of the lightning receptors 400, the following is also true: for one or more points on the other of the suction side or pressure side of the blade at the spanwise position corresponding to the lightning receptor, the total inception voltage for a leader along any path of lightning from any of the one or more points to the lightning receptor via the interior of the blade is greater than the total inception voltage for a leader along an indirect path from the point to the lightning receptor around the exterior surface of the blade.

FIG. 4A shows a schematic view of a wind turbine blade 200' according to embodiments. The blade 200' may comprise any of the elements disclosed with reference to FIGS. 3A to 3E. In addition, the blade 200' comprises two or more lightning receptors 400A, 400B which are located at the same spanwise position of the blade 200' and both located on the same side of the blade 200' (i.e., either the suction side 26 or the pressure side 25 as shown in FIG. 4B). Two or more lightning receptors may be place at the same spanwise position for one or a plurality of spanwise positions. That is, a first plurality of lightning receptors may be provided at a first same spanwise position, and a second plurality of lightning receptors may be provided at a second same spanwise position. The two or more lightning receptors 400A, 400B are electrically connected to the down conductor 31 as for the lightning receptors 400 described with reference to blade 200. Further, as for the lightning receptors 400 previously described, the two or more lightning receptors may be directly connected to the down conductor 31 or may be connected via one or more conductive blocks 402 such as the blocks 402 previously described.

It will be appreciated that the down conductor 31 may comprise a series of interconnected cables which electrically connect to all of the lightning receptors to transmit the lightning current from any of the lightning receptors to the base 21 of the blade 200 or 200'.

FIG. 4B shows a cross-sectional view of the wind turbine blade 200' of FIG. 4A taken along line 4B-4B. As shown in FIG. 4B, one of the two or more lightning receptors (receptor 400A) may be provided more proximal to the leading edge 24 of the blade 200' at the spanwise position, and another other of the two or more lightning receptors (receptor 400B) may be provided more proximal to the trailing edge 23 of the blade 200'.

The blade 200' may also be provided with a structural support 406. such as a web, extending between the pressure and suction sides of the blade 200', wherein one of the two or more lightning receptors is provided on a first side of the structural support 406, and another of the two or more lightning receptors is provided on a second side of the structural support 406 opposite to the first side.

In some embodiments, all of the lightning receptors 400A, 400B, 400 provided in the proximal region 3 are provided on a single side of the blade 200'. In such embodiments the down conductor 31 may extend along the entire length of the proximal region 3 proximal to a single side of the blade 200', such as illustrated in FIG. 3E.

Figure 4C:
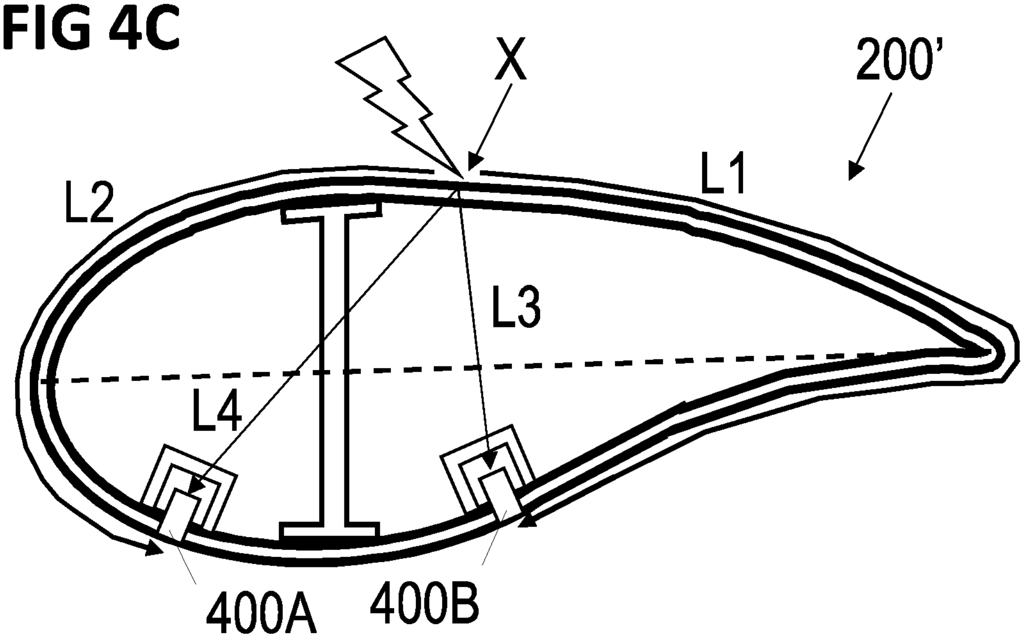
FIG. 4C shows possible paths of lightning current for the wind turbine shown in FIG. 4B.

FIG. 4C shows possible paths of lightning current for the wind turbine 200' shown in FIG. 4B. Whilst there is provided a new possible path L4 through the interior of the blade 200', this does not typically provide a substantially lower insulation level for the interior lightning paths. On the other hand, path L2 is substantially shortened meaning that the difference between insulation levels for the indirect exterior paths L1 and L2 and those of the interior leader paths L3 and L4 may be increased, further strengthening the protection against lightning strikes on the opposite side of the blade 200'. As the lightning receptors 400A and 400B are provided on a single side of the blade 200', the manufacturing process remains simplified.

According to embodiments of the invention, there is also provided a method of manufacturing a blade for a wind turbine. In embodiments, the method comprises providing a blade (for example blade 200 or 200') having a non-conductive exterior surface. In embodiments, the method further comprises providing a down conductor for conducting lightning current towards a base portion of the blade and locating the down conductor in an interior of the blade. In embodiments, the method also comprises providing one or more lightning receptors. For each lightning receptor, in embodiments, the method comprises: extending the lightning receptor through the exterior surface of a suction side or a pressure side of the blade at a spanwise position of the blade and exposing the lightning receptor externally to the blade; and electrically connecting the lightning receptor to the internal down conductor. For one or more lightning receptors, for one or more points on the other of the suction side or pressure side of the blade at the spanwise position corresponding to the lightning receptor, the breakdown voltage for a path of lightning from any of the one or more points to the lightning receptor through the interior of the blade is greater than the breakdown voltage for an indirect path from the point to the lightning receptor around the exterior surface of the blade.

It is noted that the blade may be provided by producing a complete blade shell comprising pressure and suctions sides before the down conductors and lightning receptors are provided. For example, the blade may be provided using a process known in the art as a "one-shot" process of manufacture.

In some embodiments, the blade may be provided by separately forming a suction side of the blade and a pressure side of the blade, and subsequently joining the suction side and pressure side of to form the blade as known in the art. For example, the blade may be provided using a process known in the art as a "butterfly" process of manufacture. In such embodiments, the one or more lightning receptors may be extended through the exterior surface of either the suction side or the pressure side (i.e., all on the same side) of the blade, and electrically connected to the down conductor on the same side, before the suction side and pressure side are joined. This provides a simple process of manufacture of the blades.

It will be appreciated that whilst in some embodiments one or more blades according to the invention are provided on the wind turbine described with reference to FIG. 1, in embodiments one or more blades according to the invention may be provided on any suitable wind turbine which is configured to convert wind energy into another type of energy.

It will further be appreciated that the shapes of the blades shown in the figures are exemplary only, and the shape of the blade including the length, width, thickness, and airfoil at each spanwise position may be varied according to the desired aerodynamic properties of the blade without departing from the scope of embodiments of the invention.

Similarly, it will be appreciated that the various components of the blade and wind turbine may be made of any suitable material without departing from the scope of embodiments of the invention.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A blade for a wind turbine comprising a tip region, extending from a tip end to an intermediate spanwise position, a proximal region, extending from the intermediate spanwise position to a base portion, a lightning protection system and a non-conductive exterior surface, the lightning protection system comprising:

an internal down conductor for conducting lightning current towards the base portion of the blade; and one or more lightning receptors, the one or more lightning receptors located on a suction side or a pressure side of the blade at a spanwise position of the blade, the one or more lightning receptors extending through the exterior surface of the blade and electrically connected to the internal down conductor;

wherein for a lightning receptor of the one or more of the lightning receptors:

for one or more points on an other of the suction side or pressure side of the blade at the spanwise position corresponding to the lightning receptor, an electrical insulation level for a leader along any path of lightning from any of the one or more points to the lightning receptor via an interior of the blade is greater than an electrical insulation level for a leader along an indirect path from the point to the lightning receptor around the exterior surface of the blade, wherein the leader is an ionized path, wherein, in the proximal region, all lightning receptors are located at a same suction side or pressure side of the blade.

2. The blade according to claim 1, wherein the blade comprises the tip region extending from a distal tip of the blade to the intermediate spanwise position, and the proximal region extending from the base portion of the blade to the intermediate spanwise position, wherein the one or more lightning receptors are provided in the proximal region of the blade.

3. The blade according to claim 2, wherein the proximal region comprises a plurality of the lightning receptors at different spanwise positions.

4. The blade according to claim 3, wherein the plurality of the lightning receptors are all provided on the suction side of the blade or the pressure side of the blade.

5. The blade according to claim 2, wherein the tip region comprises one or more lightning receptor pairs at a spanwise position in the tip region, each of the one or more lightning receptor pairs comprising a first lightning receptor located on the suction side of the blade and a second lightning receptor located on the pressure side of the blade, the first and second lightning receptors extending through the exterior surface of the blade and electrically connected to the internal down conductor.

6. The blade according to claim 1, wherein for, the lightning receptor is electrically connected to an electrically conductive block mounted to an interior surface of the blade at the spanwise position of the lightning receptor, wherein the electrically conductive block is electrically connected to the internal down conductor.

7. The blade according to claim 6, wherein for the lightning receptor, an electrical insulator covers the lightning receptor in the interior of the blade such that any path of lightning through the interior of the blade passes through the electrical insulator.

8. The blade according to claim 7, wherein at one or more spanwise positions of the blade, two or more lightning receptors are provided, both located on the suction side or the pressure side of the blade.

9. The blade according to claim 8, wherein one of the two or more lightning receptors is provided more proximal to a leading edge of the blade, and another of the two or more lightning receptors is provided more proximal to a trailing edge of the blade.

10. The blade according to claim 8, further comprising a structural support extending between the pressure side and the suction side of the blade, wherein one of the two or more lightning receptors is provided on a first side of the structural support, and another of the two or more lightning receptors is provided on a second side of the structural support opposite to the first side.

11. The blade according to claim 10, wherein the internal down conductor extends along the blade proximal to the pressure side along an entire length, or proximal the suction side along an entire length.

12. A wind turbine comprising one or more blades according to claim 11.

13. A method of manufacturing a blade for a wind turbine, the method comprising:

providing a blade having a non-conductive exterior surface;

providing a down conductor for conducting lightning current towards a base portion of the blade and locating the down conductor in an interior of the blade;

providing one or more lightning receptors in an intermediate region of the blade all at the same suction side or pressure side of the blade and for each lightning receptor:

extending the lightning receptor through the exterior surface of the suction side or pressure side of the blade at a spanwise position of the blade and exposing the lightning receptor externally to the blade; and electrically connecting the lightning receptor to the down conductor;

wherein a lightning receptor of the one or more of the lightning receptors:

for one or more points on the other of the suction side or pressure side of the blade at the spanwise position corresponding to the lightning receptor, an electrical insulation level for a path of lightning from any of the one or more points to the lightning receptor through the interior of the blade is greater than an electrical insulation level for an indirect path from the point to the lightning receptor around the exterior surface of the blade.

14. The method according to claim 13, wherein the step of providing the blade comprises separately forming the suction side of the blade and the pressure side of the blade and joining the suction side and pressure side to form the blade.

15. The method according to claim 14, wherein the one or more lightning receptors are extended through the exterior surface of the suction side or pressure side of the blade and electrically connected to the internal down conductor before the suction side and pressure side are joined.

* * * * *